United States Patent [19]

Pareja

[11] 4,171,708
[45] Oct. 23, 1979

[54] BYPASS AND UNLOADER VALVE

[75] Inventor: Ramon Pareja, Minneapolis, Minn.

[73] Assignee: Lear Siegler, Inc., Santa Monica, Calif.

[21] Appl. No.: 790,706

[22] Filed: Apr. 25, 1977

[51] Int. Cl.² .................. F16K 11/00; F16K 31/363
[52] U.S. Cl. .................................... 137/115; 417/311
[58] Field of Search ............... 137/115; 91/24, 25, 91/408; 92/13.41, 85 B; 417/307, 311

[56] References Cited

U.S. PATENT DOCUMENTS

| 516,863 | 3/1894 | Gresham | 137/533.11 |
| 2,313,351 | 3/1943 | Magnusen | 137/115 X |
| 2,342,001 | 2/1944 | Magnuson | 137/115 X |
| 3,626,812 | 12/1971 | Trick | 91/408 X |

*Primary Examiner*—William R. Cline

*Attorney, Agent, or Firm*—Orrin M. Haugen; Thomas J. Nikolai

[57] ABSTRACT

A bypass and unloader valve capable of operation as a full unloader valve or volume control for fluid pressure systems. The structure utilizes a valve body having an inlet, an outlet, and a bypass, with check valve means being provided to accommodate normal flow from the inlet to the outlet. When the pressure rises in the outlet, this pressure is applied against a reciprocatory plunger, and the force generated lifts the plunger, and a stem extension coupled to the plunger unseats a check valve, thereby opening a fluid path from the inlet to the bypass. Improved guide and sealing means are provided for the plunger and associated stem assembly, the plunger and stem being spring biased to accommodate normal flow.

3 Claims, 5 Drawing Figures

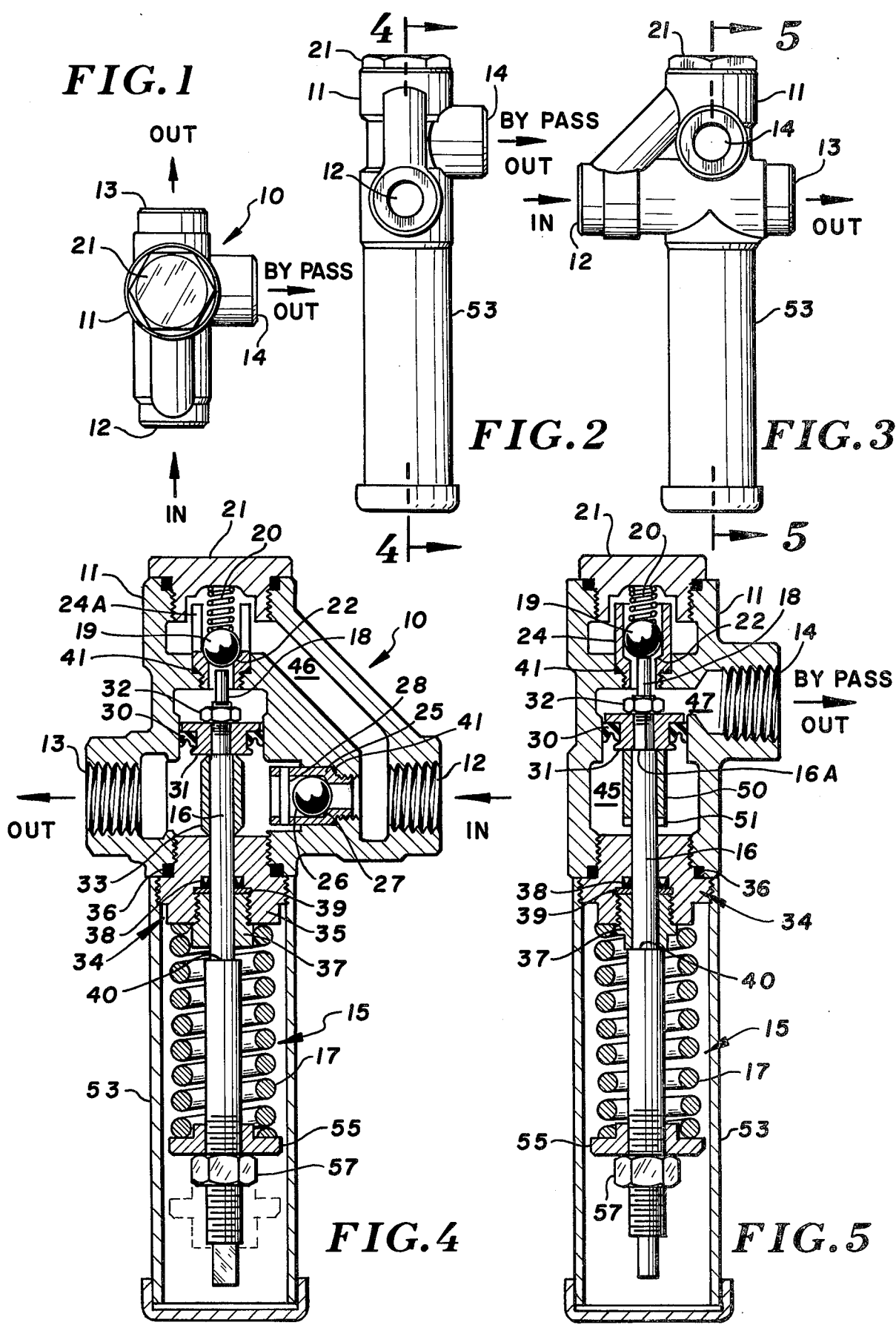

BYPASS AND UNLOADER VALVE

BACKGROUND OF THE INVENTION

The present invention relates generally to an improved bypass and unloader valve, and more particularly to such a valve structure having improved design features, including inlet and outlet port disposition, and sealing and guide arrangements for the check valve unseating stem. In the past, bypass and unloader valve structures have been provided which function in a fashion similar to that of the present device, however these devices have presented some unusual production and machining requirements, and the finished products have frequently encountered problems due to guide and seal arrangements.

Bypass and unloader valves are particularly desired for high pressure fluid systems which employ a discharge which is intermittently shut off. Typically, such systems are employed for liquid high pressure sprayers and washers, although a variety of other applications are, of course, common. When the system is equipped with an unloader valve, the discharge may be completely shut off without stopping or interrupting the operation of the pump itself.

By incorporating the bypass feature, a partial bypass may be provided in instances where the discharge is only partially closed or, if the orifice in the outlet becomes restricted so that the capacity of the pump may not be discharged under the normal conditions. In the event of such an occurrence, pressure will increase in the discharge line, and the bypass feature of the combined bypass and unloader valve will operate to effect a partial bypass of the liquid being pumped. When the discharge is closed the unloader functions to completely bypass the entire output of the pump, thus achieving unloading of the entire pump capacity. Upon opening of the discharge, the function of the valve is to close the bypass and restore normal flow conditions and operation.

While these operations are typical for bypass and unloader valve combinations, and while these devices have been available in the past, problems have developed in their manufacture and use due to unusual design configurations and difficult guide and seal functions which normally are present. With regard to unusual design configurations, the inlet and outlet ports have normally been arranged in other than coaxial disposition, and such a positioning of these ports and the bores associated therewith have resulted in a relatively expensive machining operation. Also, the configuration has been such that substantial pressure losses are encountered during periods of normal flow, and such pressure losses are, of course, deemed undesirable. The present arrangement provides for coaxially disposed inlet and outlet ports, along with the bores which interconnect these ports. The design is such that very little, if any, pressure drop occurs during normal periods of flow.

The valve utilizes a variable spring biased plunger mounted on a stem in a discharge chamber, the plunger having its inner end disposed to unseat a check valve in the system upon lifting of the plunger. In order to achieve proper biasing, a relatively long helical spring is desired, with the spring force being adjustable and designed to provide the required bias. The length of the spring determines, at least in part, the axial length requirement of the stem upon which the plunger is mounted. As is conventional, this stem is received in a stuffing box and is equipped with stem seals. Because of the reciprocatory motion of the stem within the assembly, and the length thereof, problems have been encountered in the past with leakage in the stuffing box and the stem seal area. Also, guiding has occasionally presented some problems with the stuffing box normally providing the guiding function.

SUMMARY OF THE INVENTION

In accordance with the present invention, an unloader valve is provided which utilizes an improved valve body design, the valve body having an inlet port and an outlet port, and a bore extending along a straight line therethrough to accommodate normal flow. Furthermore, the bores provided for accommodating bypass flow are sufficiently straightforward and uncomplicated so as to accommodate stable operation of the valve during periods of functioning in the bypass mode. The operation of the valve so as to function between normal flow and bypass flow modes is accomplished by a reciprocating plunger, with the plunger having spaced apart guiding surfaces so as to avoid canting or binding of the plunger during normal operation thereof. The valve further is provided with an adjustable compression spring which provides a force in opposition to the force generated by the system. The stem to which the plunger is secured passes through a stuffing box, with the stuffing box having an elongated bore formed therein to provide a corresponding elongated guide for the reciprocating motion of the stem. The stuffing box is provided with annular seals for the stem, thus enhancing the reliability of the valve structure.

Therefore, it is a primary object of the present invention to provide an improved bypass and unloader valve of improved structural design and utilizing a reciprocatory plunger guided and sealed within an improved guide and seal assembly.

It is a further object of the present invention to provide an improved bypass and unloader valve which is particularly designed for reliable operation with low pressure drop in high pressure liquid systems employing a discharge which is intermittently interrupted or shut off.

It is yet a further object of the present invention to provide an improved unloader and bypass valve which is economically produced, and which is provided with design features enhancing reliability and life-time of the valve.

Other and further objects of the present invention will become apparent to those skilled in the art upon a study of the following specification, appended claims, and accompanying drawing.

BRIEF DESCRIPTION OF THE DRAWING

FIG. 1 is a top plan view of the improved bypass and unloader valve of the present invention, and illustrating the fluid paths through the valve;

FIG. 2 is a side elevational view of the structure illustrated in FIG. 1;

FIG. 3 is a front elevational view of the bypass and unloader valve, with the view being taken toward the bypass outlet port of the structure;

FIG. 4 is a vertical sectional view, on a slightly enlarged scale, taken through the line and in the direction of the arrows 4—4 of FIG. 3, with a phantom view illustrating an alternate setting for the compressional force exerted upon the variable spring member; and FIG. 5 is a vertical sectional view, on a slightly enlarged scale, taken through the line and in the direction of the arrows 5—5 of FIG. 3, and illustrating the valve with a modified form of spacer along the actuating stem, and further illustrating the valve in bypass disposition.

DESCRIPTION OF THE PREFERRED EMBODIMENT

In accordance with the preferred embodiment of the present invention, the improved valve structure generally designated 10 is provided with a body member 11, with ports being formed therein including an inlet port 12, an outlet port 13, and a bypass port 14. A piston and stem assembly generally designated 15, having portions extending generally outwardly of the body 11 includes a plunger rod stem 16 and a pressure adjusting spring 17, with stem 16 having an inner terminal end as at 18 which serves to unseat ball check or poppet 19 upon inward reciprocal movement of piston assembly 15.

Ball check 19 is normally biased by resilient spring member 20, and is held in place against the inner surface of cap 21. A seat 22 is provided for ball check 19, with the seat being conventional and capable of withstanding those forces normally encountered by the system. In its preferred configuration, the body portion 24 which retains ball check 19 is slotted in order to enhance the flow therethrough, and permit discharge of materials therefrom, as is illustrated at 24A.

A second valve assembly is illustrated and is disposed between the inlet and the outlet, with this assembly having a valve body 25 retaining the ball check or poppet 26, ball check 26 being biased against seat 27 by pressure within the discharge portion of the system.

In order to achieve reliable operation of ball checks 19 and 26, housings are provided to retain the ball checks and associated bias springs, with these housings being slotted, as illustrated. A simple peg or rod as illustrated at 28 may be utilized to capture ball 26 within body 25.

Attention is again directed to the piston assembly 15, particularly the plunger portion thereof. Plunger packing or piston seal ring 30 is retained on piston spreader 31, with spreader 31 having its lower body surface in communication with the interior of the discharge portion of the system, that is, downstream from ball check 26. A nut 32 is threaded onto the shank of stem 16, and retains spreader 31 in proper disposition against a shoulder 16A at stem 16 just above spacer sleeve 33. Spacer sleeve 33 extends between the lower surface of spreader 31 and the upper surface of stuffing box assembly generally designated 34. As is apparent in the sectional view of FIG. 4, stuffing box 34 has an elongated bore extending therethrough to receive and guide stem 16, with stem 16 having a shoulder formed thereon to strengthen the overall assembly adjacent zones of contact with spring member 17. An upper nut 35 is utilized to form a portion of stuffing box 34, and is threadedly secured in body 11, and sealed from the atmosphere as at 36. A second nut or lower nut 37 is provided for engaging a threaded counter-bore formed in nut 35, nut 37 forming a cylindrical member about which spring 17 may be retained. Inner seals are provided as at 38, and including a generally "U" shaped seal member retained in place by polytetrafluoroethylene disc 39. Spring 17 is held in place, about stem 16, with the compression of spring 17 being determined by nut 57. Nut 57 is effectively a spring adjusting nut, inasmuch as its disposition along the axial length of stem 16 will determine the force available from spring 17. As will be apparent from the drawings, shoulder 40 on stem 16 limits the extent of movement of stem 16 against poppet 19.

In order to provide controlled sealing of the cages retaining ball checks 19 and 26, cage cap gaskets such as at 41 may be provided, as indicated. Thus, the individual ball checks may be inspected and serviced from time to time and the assembly re-assembled for use with a minimum of down-time required.

As is apparent in the drawing, valve body 11 has internal bores or channels formed therein. In particular, a first channel means is provided which interconnects the inlet and the outlet, and normally provides unidirectional fluid flow from the inlet to the outlet. This is accomplished by having the inlet 12 and the outlet 13 connecting the straight through bore or channel generally designated 45 through ball check assembly retaining ball check 26 and its orifice with seat 27.

A second channel interconnects the inlet and the bypass, with this channel being shown generally at 46, and normally being closed due to the presence of ball check 19 which blocks flow through seat 22 toward bypass 14 and bypass chamber 47. With attention being directed to FIG. 5 of the drawings, it will be observed that spacer 33 is in somewhat modified form, having a flat upper edge surface as at 50, and a slotted lower edge surface as at 51. The slots formed at the base of spacer 33, in the embodiment illustrated in FIG. 5, reduce the force required to move stem 16 upwardly against poppet 19 by virtue of increasing the area of piston 30 exposed to outlet pressures in outlet chamber 45. Also, the utilization of slots at the base of spacer 33 enhance the stability of the system during operation, particularly when cycling between normal and bypass modes.

In operation, when the force available from output pressure exceeds the force of biasing spring 17, and accounting for the area lost due to the cross-sectional area of stem 16, the entire piston assembly 15 will move upwardly to the extent that inner ends 18 of stem 16 will unseat ball check 19, and thus permit the passage of fluid from the inlet through channel 46, and thence outwardly through bypass 14.

For purposes of preparation and installation, it will be noted that inlet 12 and outlet 13 are disposed in coaxial relationship, one with the other. This permits ease of machining, and also permits ease of installation of the valve in a given conduit system. Additionally, pressure drops are reduced in this type of system, particularly pressure drops during the normal operation of the system.

As an additional feature of the device, cylindrical enclosure 53 is provided at the base of body 11, with enclosure 53 being threadedly engaged on a threaded outer shoulder of upper nut 35. Enclosure 53 preserves the integrity of the system by reducing the collection of debris which may inadvertently render spring 17 solid, and also as a safety shield that encloses the spring 17 in case of defective material breakages.

As is apparent, the motion of stem 16 is limited by shoulder 40 abutting against the lower surface of nut 37. Accordingly, as is illustrated in phantom in FIG. 4, the compressive force on spring 17 may be reduced by simply moving spring tension control nut 57 downwardly along stem 16. In this manner, therefore, the pressure at which the valve assembly responds may be controllably varied depending upon the requirements and indications of the system being controlled.

Reliability of operation is enhanced by virtue of the disposition of stuffing box nut and guide. Thus, the forces working on stem 16 tend to be in reasonable alignment with the axis of stem 16, thus reducing wear between relatively movable surfaces, thus increasing the lifetime of the device.

I claim:

1. In an unloader valve means comprising, in combination:
    (a) a valve body having an inlet, an outlet, and a bypass, said inlet and outlet being generally aligned across said valve body and said bypass being out of alignment and oriented generally transverse to the alignment of said inlet and outlet; first channel means interconnecting said inlet and said outlet, first check valve means interposed between said inlet and said outlet and normally providing unidirectional fluid flow from said inlet to said outlet through a flow chamber; second channel means interconnecting said inlet and said bypass, second check valve means interposed between said inlet and said bypass and normally blocking fluid flow from said inlet to said bypass;
    (b) stuffing box means sealingly engaged in said valve body and comprising a stuffing box body with an inner surface disposed within said valve body along a first wall of said flow chamber and a portion depending therefrom, and a stem receiving bore extending through said stuffing box body;
    (c) stem means having an inner end, an outer end and a central shaft portion therebetween and being slidably received within the stem receiving bore formed in said stuffing box;
    (d) plunger means having a peripheral sealing surface and upper and lower body surfaces being secured to said stem along said central shaft portion and arranged for reciprocatory motion therewith and with the inner surface of said plunger means being along a second surface of said flow chamber and opposed to and spaced from said first wall;
    (e) said flow chamber defining an annular chamber zone between the inner surface of said stuffing box body and the inner surface of said plunger means, said annular chamber zone being in communication with said outlet;
    (f) said stem means extending outwardly from the outer surface of said plunger means and being disposed to controllably unseat said second check valve means to permit fluid flow from said inlet to said bypass when the pressure in said flow chamber exceeds a predetermined value, said stem means including shoulder means formed along the central shaft portion thereof outwardly from said stuffing box means, and arranged to contact that portion of said stuffing box means disposed radially outwardly of said stem receiving bore so as to limit the motion of said plunger in a direction toward said second check valve means; and
    (g) a spacer sleeve being disposed annularly about said stem for limiting the inward travel of said stem away from said second check valve means and toward said stuffing box means, said spacer sleeve being shaped to provide fluid communication between the inner diameter of said sleeve and said flow chamber.

2. The unloader valve means as defined in claim 1 being particularly characterized in that said spacer sleeve is slotted radially along one end thereof, with said slot extending between the inner diameter and outer diameter of said spacer sleeve to increase the effective area of said plunger means subjected to pressure within said flow chamber.

3. The unloader valve means as defined in claim 1 being particularly characterized in that resilient spring means are arranged about the outer periphery of said stem means.

* * * * *